US012644568B2

(12) United States Patent
Sako et al.

(10) Patent No.: US 12,644,568 B2
(45) Date of Patent: Jun. 2, 2026

(54) GAS TANK

(71) Applicant: TOYOTA JIDOSHA KABUSHIKI KAISHA, Toyota (JP)

(72) Inventors: Shinnosuke Sako, Toyota (JP); Tomoyoshi Kobayashi, Toyota (JP); Yutaka Sawada, Toyota (JP); Kosuke Kobayashi, Toyota (JP); Yuya Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/012,137

(22) Filed: Jan. 7, 2025

(65) Prior Publication Data

US 2025/0305639 A1 Oct. 2, 2025

(30) Foreign Application Priority Data

Mar. 29, 2024 (JP) ................................ 2024-056153

(51) Int. Cl.
*F17C 13/08* (2006.01)

(52) U.S. Cl.
CPC .... *F17C 13/084* (2013.01); *F17C 2201/0109* (2013.01); *F17C 2201/035* (2013.01); (Continued)

(58) Field of Classification Search
CPC ............ F17C 13/08; F17C 13/083–085; F17C 2201/0109; F17C 2201/035; F17C 2205/01; F17C 2205/0103; F17C 2205/0107; F17C 2205/013; F17C 2205/0153; F17C 2205/0157; F17C 2205/0192; F17C 2221/012; F17C 2270/0184; B65D 88/128–129; B65D 88/14
USPC ........ 220/562, 23.4, 481, DIG. 24, 1.5, 266; 206/446, 53, 591, 413, 416; 248/312, 248/154, 230.1, 500, 201, 205.1, 205.3, 248/215, 56; 211/85.18; 137/376; 24/277, 569; 280/834
See application file for complete search history.

(56) References Cited

U.S. PATENT DOCUMENTS 2,380,562 A * 7/1945 Watson, Jr. ............. B60P 3/222 211/74
3,294,225 A * 12/1966 Kenyon ............... B65D 81/113 206/820

(Continued)

FOREIGN PATENT DOCUMENTS

CN 203975535 U * 12/2014
EP 0687587 A1 * 12/1995 ....... B60K 15/03006

(Continued)

*Primary Examiner* — Orlando E Aviles
*Assistant Examiner* — Brijesh V. Patel
(74) *Attorney, Agent, or Firm* — SoraIP, Inc.

(57) ABSTRACT

The gas tank disclosed herein includes a tank body, a first neck, a neck mount, a mount plate, and a plate bolt. The first neck extends from one end of the tank body along its axis and is provided with external threads on its outer periphery. The neck mount is a component for fixing the tank body to the apparatus, and has a first female screw hole that is screwed into the male screw of the first neck. The mount plate has a second female screw hole screwed into the male screw and faces the neck mount. The plate bolt presses the mount plate against the neck mount along the axis.

3 Claims, 4 Drawing Sheets

(52) U.S. Cl.
CPC *F17C 2205/0153* (2013.01); *F17C 2221/012* (2013.01); *F17C 2270/0184* (2013.01)

(56) References Cited

U.S. PATENT DOCUMENTS

| | | | | | |
|---|---|---|---|---|---|
| 3,653,624 | A * | 4/1972 | Abel | A61G 9/00 | 294/142 |
| 3,700,200 | A * | 10/1972 | Batchelor | B65D 83/388 | 248/312 |
| 4,183,122 | A * | 1/1980 | Wagner | F01N 13/1805 | 29/509 |
| 4,407,050 | A * | 10/1983 | Offterdinger | B21D 53/00 | D8/396 |
| 5,040,933 | A * | 8/1991 | Lee | B60P 7/12 | 410/35 |
| 5,186,324 | A * | 2/1993 | Brandon, Jr. | F15B 1/26 | 280/834 |
| 5,515,997 | A * | 5/1996 | Kirk | B60P 3/055 | 220/1.5 |
| 5,908,134 | A * | 6/1999 | Hale | F17C 13/083 | 220/582 |
| 6,536,722 | B2 * | 3/2003 | Sadowski | F17C 13/084 | 248/154 |
| 6,708,719 | B2 * | 3/2004 | Idoguchi | F17C 13/084 | 222/135 |
| 6,986,490 | B2 * | 1/2006 | Eihusen | F17C 1/00 | 248/312 |
| 7,137,474 | B2 * | 11/2006 | Yokote | F17C 13/084 | 248/500 |
| 7,534,965 | B1 * | 5/2009 | Thompson | H02G 3/22 | 174/152 G |
| 7,543,667 | B2 * | 6/2009 | Hwang | H01M 8/04201 | 248/500 |
| 10,670,191 | B2 * | 6/2020 | Yeggy | F17C 13/083 | |
| 11,148,873 | B2 * | 10/2021 | Machida | B65D 81/05 | |
| 11,932,102 | B2 * | 3/2024 | Katano | B60K 15/067 | |
| 12,115,851 | B2 * | 10/2024 | Fujii | F17C 13/084 | |
| 2001/0034998 | A1 * | 11/2001 | Yamaai | B65D 85/66 | 53/409 |
| 2004/0144882 | A1 * | 7/2004 | Small | B65H 35/0093 | 242/559 |
| 2006/0032532 | A1 * | 2/2006 | Suess | F17C 13/083 | 137/266 |
| 2010/0018591 | A1 * | 1/2010 | Jauss | B60K 15/07 | 137/376 |
| 2012/0031791 | A1 * | 2/2012 | Katsurayama | B65D 85/66 | 206/397 |
| 2012/0174371 | A1 * | 7/2012 | Koehnen | B25B 5/147 | 29/428 |
| 2014/0284236 | A1 * | 9/2014 | Kuebart | B65D 81/022 | 206/413 |
| 2022/0106152 | A1 * | 4/2022 | Kim | B65H 75/4471 | |
| 2022/0410700 | A1 * | 12/2022 | Cederberg | F17C 13/08 | |
| 2023/0073092 | A1 * | 3/2023 | Sako | B65D 19/36 | |
| 2023/0375141 | A1 * | 11/2023 | Chen | F17C 13/06 | |
| 2023/0408039 | A1 * | 12/2023 | Yim | F17C 13/084 | |

FOREIGN PATENT DOCUMENTS

| | | | |
|---|---|---|---|
| JP | 2005170272 | A * | 6/2005 |
| JP | 2017-206042 | A | 11/2017 |

* cited by examiner

GAS TANK

CROSS-REFERENCE TO RELATED APPLICATION

This application claims priority to Japanese Patent Application No. 2024-056153 filed on Mar. 29, 2024, incorporated herein by reference in its entirety.

BACKGROUND

1. Technical Field

The technology disclosed herein relates to a gas tank. In particular, the technology provides a gas tank in which a neck mount for fixing a tank body to an apparatus is removable easily.

2. Description of Related Art

The gas tank is fixed to an apparatus such as an automobile. Japanese Unexamined Patent Application Publication No. 2017-206042 (JP 2017-206042 A) discloses a structure for reducing a force applied to a valve of a gas tank when the gas tank is fixed to an apparatus. The structure disclosed in JP 2017-206042 A includes an attachment attached to a base of a tank body and a neck mount attached to the attachment. The neck mount is fixed to the apparatus. A groove extending in the circumferential direction is provided on the outer periphery of the attachment. The neck mount includes a ridge fitted to the groove of the attachment. With this structure, it is possible to reduce an input moment applied to the base through the neck mount and the attachment from the apparatus to which the gas tank is fixed. As a result, stress locally generated in the base of the gas tank can be suppressed.

The attachment of JP 2017-206042 A includes a first attachment and a second attachment adjacent in the axial direction of the base. Each of the first and second attachments has a ring shape, and an internal thread is provided on the inner surface of the ring. An external thread is provided on the outer periphery of the base, and the internal thread of each of the first and second attachments is engaged with the external thread of the base. By tightening the first and second attachments in close contact with each other, the neck mount is fixed between the first and second attachments, and the first and second attachments are fixed to the base. That is, the neck mount is fixed to the base.

SUMMARY

In the technology of JP 2017-206042 A, when the first and second attachments are tightened in close contact with each other, a large torque is required when removing them. That is, a large torque is required when the neck mount is removed from the tank body. The present specification provides a gas tank in which a neck mount is easily removable from a tank body. A portion of a cylinder (or a column) provided at an axial end of the tank body will be referred to as "neck" herein.

The gas tank disclosed herein includes a tank body, a first neck, a neck mount, a mount plate, and a plate bolt.

The first neck extends along an axis of the tank body from one end of the tank body and includes an external thread on an outer periphery.

The neck mount is a component for fixing the tank body to an apparatus. The neck mount has a first internal thread hole engaged with the external thread of the first neck.

The mount plate has a second internal thread hole engaged with the external thread and faces the neck mount.

The plate bolt presses the mount plate against the neck mount along the axis.

The neck mount and the mount plate of the gas tank disclosed herein are similar to the first and second attachments of JP 2017-206042 A, but need not be tightened together. When the mount plate is brought closer to the neck mount by the plate bolt, the distance between the thread groove of the first internal thread hole of the neck mount and the thread groove of the second internal thread hole of the mount plate deviates from an integral multiple of the pitch of the external thread. When the distance between the two thread grooves deviates from the integral multiple of the pitch of the external thread, the thread grooves of the first and second internal thread holes are firmly brought into contact with the external thread of the first neck in the pitch direction, and the neck mount and the mount plate are fixed to the first neck. When the plate bolt is loosened, each of the neck mount and the mount plate can be easily rotated, and the neck mount can be easily removed from the gas tank body.

When one end of the tank body is fixed to the apparatus, the other end of the tank body is desirably supported by the apparatus. At the other end of the tank body, expansion and contraction of the tank body are desirably allowed. Therefore, the gas tank disclosed herein desirably further has the following structure.

The gas tank further includes a second neck, a neck block, a slide collar, a cover plate, and a cover bolt provided at the other end of the tank body.

The neck block is a component for supporting the tank body on the apparatus. The neck block has a recess and has, at a bottom of the recess, a hole through which the second neck passes.

The slide collar is fitted to an outer periphery of the second neck and is disposed in the recess. The cover plate covers the recess.

The cover bolt fixes the cover plate to the neck block. The cover bolt is fastened to the neck block along the axis.

With the above structure of the other end of the gas tank, the other end of the tank body is supported by the apparatus while allowing expansion and contraction of the tank body.

Details of the technology disclosed herein and further improvements will be described in "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
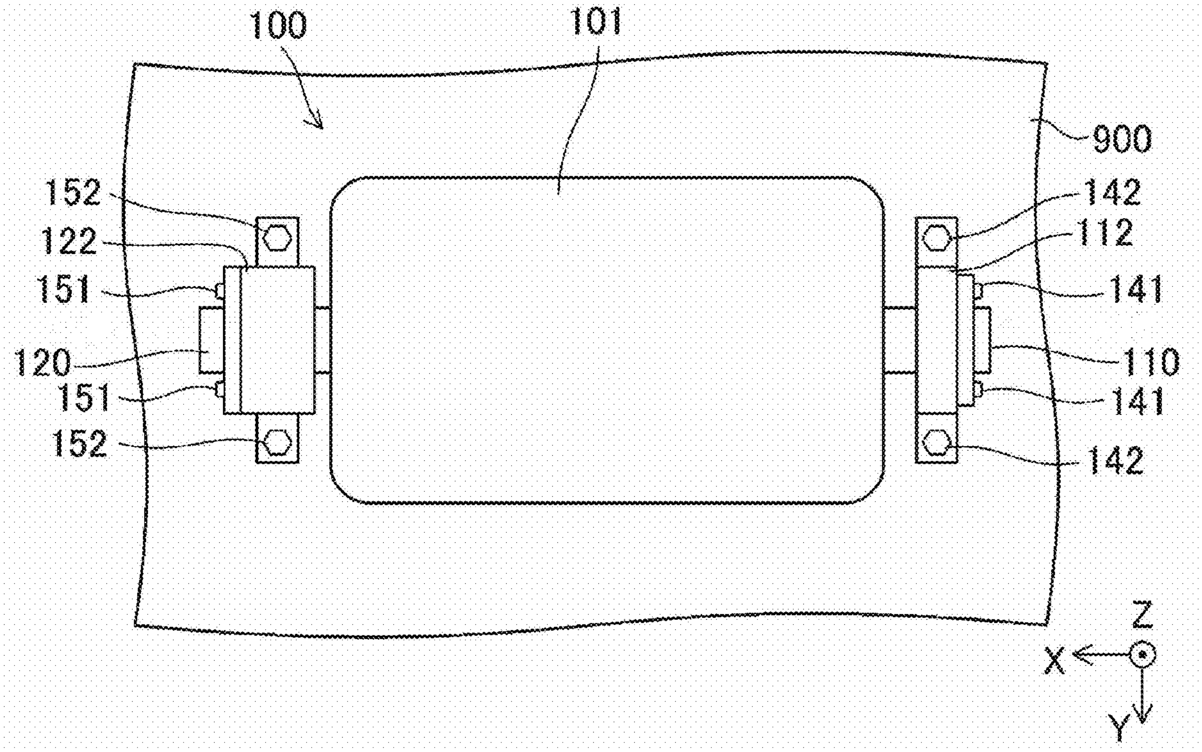
FIG. 1 is an overall plan view of a gas tank 100 of an embodiment.
Figure 2:
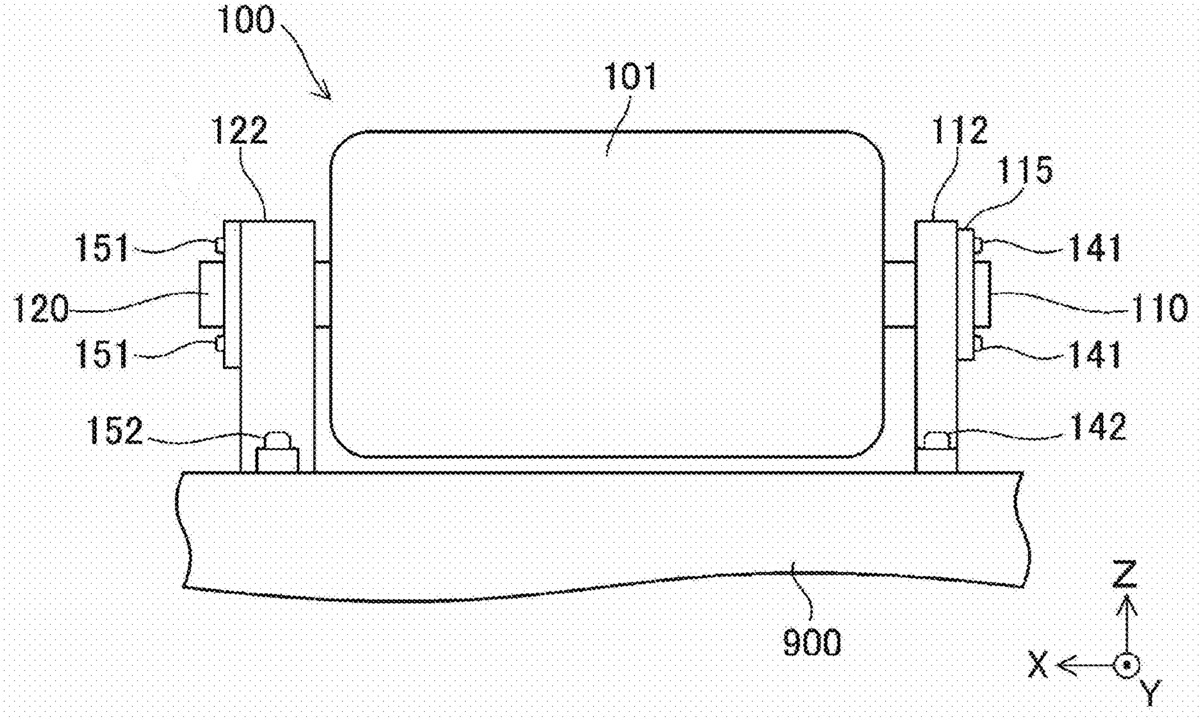
FIG. 2 is an overall side view of the gas tank 100 of the embodiment.

A gas tank 100 according to an embodiment will be described with reference to the drawings. FIG. 1 shows an overall plan view of the gas tank 100, and FIG. 2 shows an overall side view of the gas tank 100. The gas tank 100 stores hydrogen gas and is mounted on the fuel cell 900. The fuel cell 900 is an example of a device for fixing the gas tank 100. Only a portion of the fuel cell 900 is shown in the figure.

The main body (tank body 101) of the gas tank 100 is an elongated cylindrical shape. The direction of the X-axis of the coordinate system in the drawing coincides with the axial direction (longitudinal direction) of the tank body 101. One axial end of the tank body 101 is provided with a first neck 110, and the other end is provided with a second neck 120. The first neck 110 and the second neck 120 are both cylindrical (or cylindrical) and extend along the axis of the tank body 101 and are provided with external threads on the outer periphery thereof. At least one of the first neck 110 and the second neck 120 also serves as a base, and a main stop valve is provided inside the base.

A neck mount 112 is attached to the first neck 110, and the neck mount 112 is fixed to the fuel cell 900 by a bolt 142. The neck mount 112 is secured to the first neck 110 by a mount plate 115 and plate bolts 141.

A neck block 122 is attached to the second neck 120, and the neck block 122 is fixed to the fuel cell 900 by a bolt 152. The neck block 122 is attached to the second neck 120 by a cover plate 125 and a cover bolt 151. The second neck 120 is not secured to the neck block 122 and the second neck 120 can move slightly relative to the neck block 122. That is, the neck block 122 may absorb movement of the second neck 120 due to expansion or contraction of the tank body 101.

One end of the gas tank 100 in the axial direction is fixed to the fuel cell 900 via the neck mount 112, and the other end is supported by the fuel cell 900 via the neck block 122. The neck block 122 allows axial movement of the other end of the tank body 101.

Figure 3:
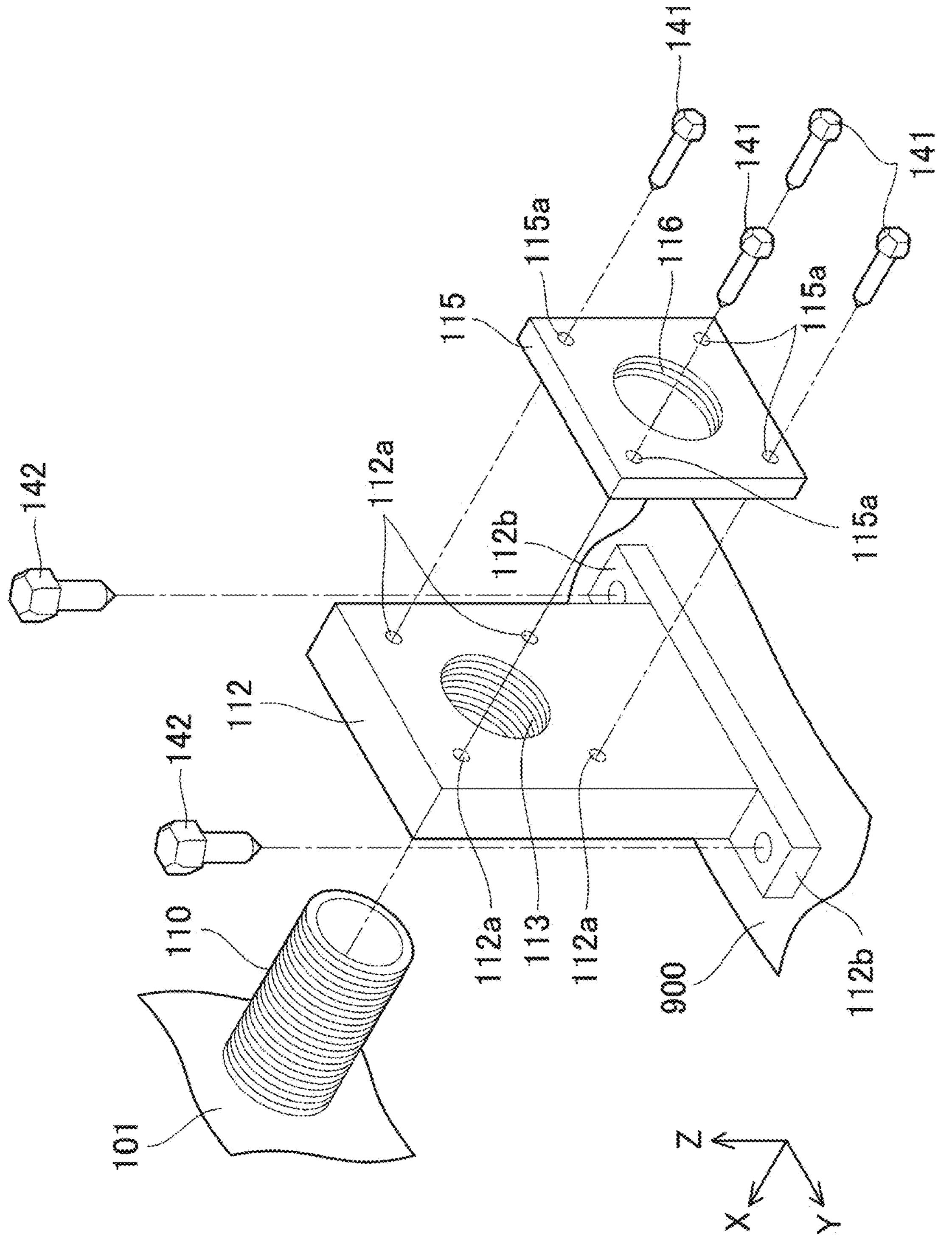
FIG. 3 is an exploded perspective view of the periphery of the first neck 110.

Structures of the first neck 110, the neck mount 112, and the mount plate 115 will be described. FIG. 3 shows an exploded perspective view of the first neck 110 and its surrounding components. A neck mount 112 and a mount plate 115 are attached to the first neck 110.

The neck mount 112 is plate-shaped and has a first female screw hole 113 and four small holes 112*a*. Each of the first female screw hole 113 and the four small holes 112*a* extends along the axial line of the tank body 101. The first neck 110 is inserted into the first female screw hole 113. A female screw into which a male screw of the first neck 110 is screwed is provided inside the first female screw hole 113. A female screw is also provided inside each of the four small holes 112*a*.

A flange 112*b* is provided in a lower portion of the neck mount 112, and a hole is also provided in the flange 112*b*. Bolts 142 are passed through the holes in the flange 112*b* and secured to the fuel cell 900. Bolt 142 secures neck mount 112 to fuel cell 900. When the neck mount 112 is fixed to the fuel cell 900, one end of the tank body 101 is fixed to the fuel cell 900. The neck mount 112 is a component for fixing the tank body 101 to the fuel cell 900.

The mount plate 115 has a plate shape, and is provided with a second female screw hole 116 and four small holes 115*a*. The first neck 110 is inserted into the second female screw hole 116. A female screw into which a male screw of the first neck 110 is screwed is provided inside the second female screw hole 116.

After the neck mount 112 is attached to the first neck 110, the mount plate 115 is attached to the first neck 110. When the mount plate 115 is rotated, the mount plate 115 approaches the neck mount 112. The mount plate 115 faces the neck mount 112.

When the mount plate 115 approaches the neck mount 112, the mount plate 115 is rotated so that the small hole 112*a* of the neck mount 112 and the small hole 115*a* of the mount plate 115 overlap each other. The small hole 115*a* has an inner diameter to which the plate bolt 141 can be loosely fitted. Plate bolts 141 are passed through the respective small holes 115*a* and the plate bolts 141 are fastened to the small holes 112*a* of the neck mount 112. The plate bolts 141 press the mount plate 115 against the neck mount 112 parallel to the axis of the tank body 101.

When the plate bolts 141 are further tightened, the distance between the first female screw hole 113 of the neck mount 112 and the second female screw hole 116 of the mount plate 115 deviates from an integer multiple of the pitch of the male screw of the first neck 110. When the distance between the first and second female screw holes deviates from an integral multiple of the pitch of the male screws, the thread grooves of the first and second female screw holes firmly adhere to the male screws of the first neck 110 in the pitch direction. As a result, the neck mount 112 and the mount plate 115 are fixed to the first neck 110. When the plate bolts 141 are loosened, each of the neck mount 112 and the mount plate 115 can be easily rotated, and the neck mount 112 can be easily removed from the first neck 110 (the tank body 101).

Figure 4:
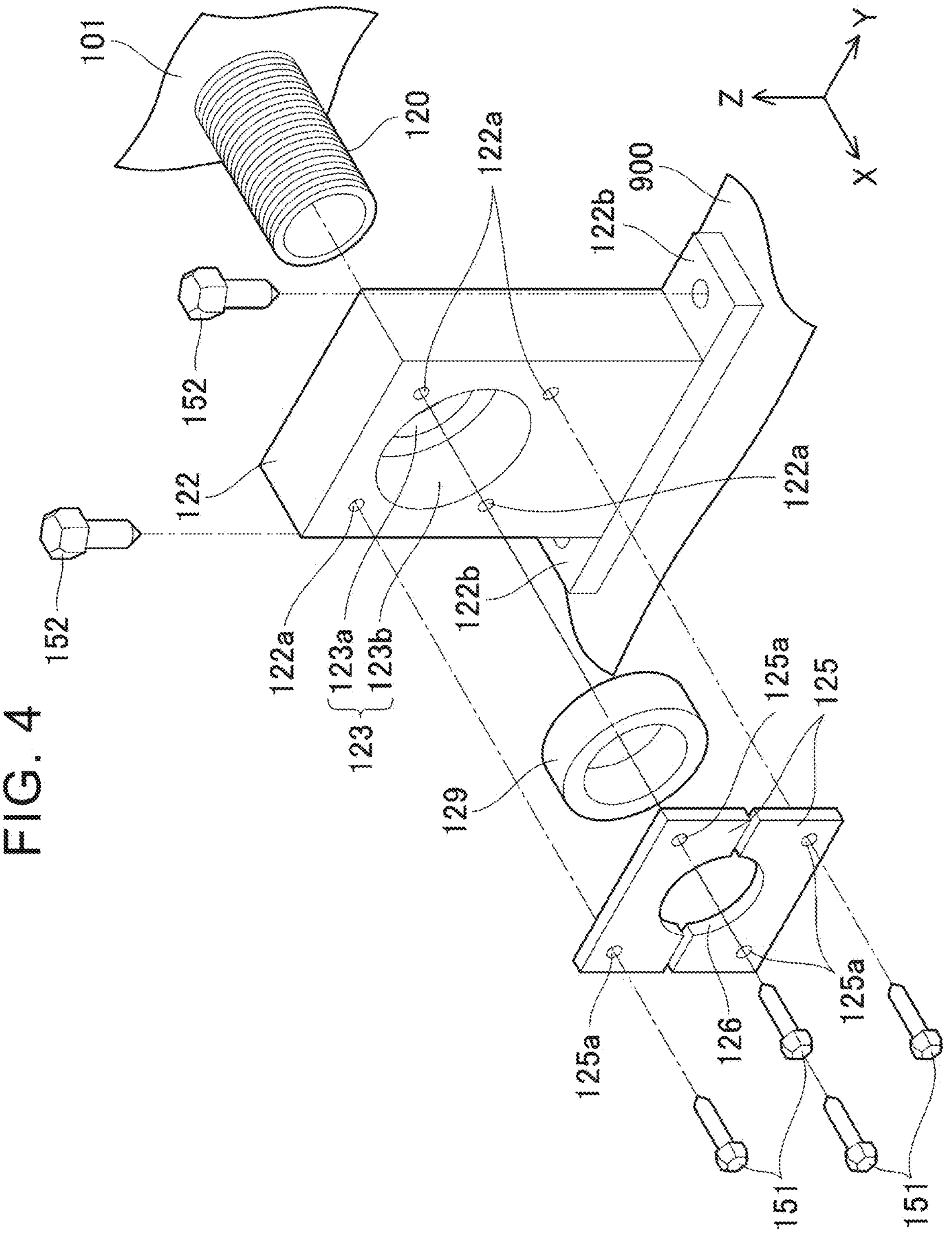
FIG. 4 is an exploded perspective view of the periphery of the second neck 120.

The structure of the second neck 120, the neck block 122, and the cover plate 125 will be described. FIG. 4 shows an exploded perspective view of the second neck 120 and its surrounding components. A neck block 122, a cover plate 125, and a slide collar 129 are attached to the second neck 120.

The neck block 122 is provided with a neck hole 123 and four small holes 122*a*. The inner side of the neck hole 123 has two stages, and a portion having a smaller diameter is referred to as a small-diameter portion 123*a*, and a portion having a larger diameter is referred to as a recess 123*b*. A small-diameter portion 123*a* is provided at the bottom of the recess 123*b*.

The second neck 120 is inserted through the neck hole 123. The diameter of the neck hole 123 (the diameter of the small-diameter portion 123*a*) is large enough for the second neck 120 to be loosely fitted. A female screw is also provided inside each of the four small holes 122*a*.

A slide collar 129 is disposed in the recess 123*b* of the neck hole 123. The slide collar 129 is cylindrical and internally provided with an internal thread into which the external thread of the second neck 120 is screwed. The outer diameter of the slide collar 129 is smaller than the inner diameter of the recess 123*b*, and the thickness (axial thickness) of the slide collar 129 is shorter than the depth of the recess 123*b*. Therefore, the slide collar 129 fits completely in the recess 123*b*. A gap (margin) is secured between the inner surface of the recess 123*b* and the outer surface of the slide collar 129. Also in the axial direction of the second neck 120, a gap (margin) is secured between the slide collar 129 and the bottom of the recess 123*b*.

A flange 122*b* is provided in a lower portion of the neck block 122, and a hole is also provided in the flange 122*b*.

Bolts 152 are passed through the holes in the flange 122*b* and secured to the fuel cell 900. That is, the neck block 122 is fixed to the fuel cell 900.

The cover plate 125 has a plate shape, and is provided with a center hole 126 and four small holes 125*a*. The second neck 120 is inserted into the center hole 126. The diameter of the center hole 126 is sized to allow the second neck 120 to loosely fit. Further, since the diameter of the center hole 126 is smaller than the outer diameter of the slide collar 129, the slide collar 129 cannot pass through the cover plate 125. The cover plate 125 is vertically divided into two parts. In other words, the cover plate 125 is cut into two portions in a plane passing through the axis.

After the second neck 120 is inserted through the neck block 122 and the neck block 122 is fixed to the fuel cell 900, the slide collar 129 is attached to the second neck 120. The slide collar 129 is advanced to a position that fits within the recess 123*b* of the neck block 122.

After the slide collar 129 is attached to the second neck 120, the cover plate 125 is attached to the neck block 122. The cover plate 125 is fixed to the neck block 122 by four cover bolts 151. Each cover bolt 151 is threaded through the small hole 125*a* of the cover plate 125 and then screwed into the small hole 122*a* of the neck block 122. Each cover bolt 151 is fastened to the neck block 122 along the axis of the tank body 101.

As described above, the neck hole 123 (small diameter portion 123*a*) and the center hole 126 are loosely fitted to the second neck 120. The outer diameter of the slide collar 129 fixed to the second neck 120 is smaller than the inner diameter of the recess 123*b*. Further, the thickness of the slide collar 129 is shorter than the depth of the recess 123*b*. Therefore, the second neck 120 to which the slide collar 129 is fixed has room to move in the axial direction (the direction of the X-axis of the coordinate system in the drawing).

In the tank body 101, the first neck 110 is fixed to the fuel cell 900 via the neck mount 112, and the second neck 120 is supported by the fuel cell 900 via the neck block 122. The second neck 120 has room for axial movement. The tank body 101 expands/contracts in response to the internal pressure. Since the first neck 110 is fixed to the fuel cell 900, the second neck 120 may move relative to the fuel cell 900. The neck block 122 absorbs axial movement of the second neck 120 due to expansion/contraction of the tank body 101 due to the aforementioned room. When the tank body 101 expands or contracts, no significant stress is generated in the second neck 120.

Modification

Figure 5:
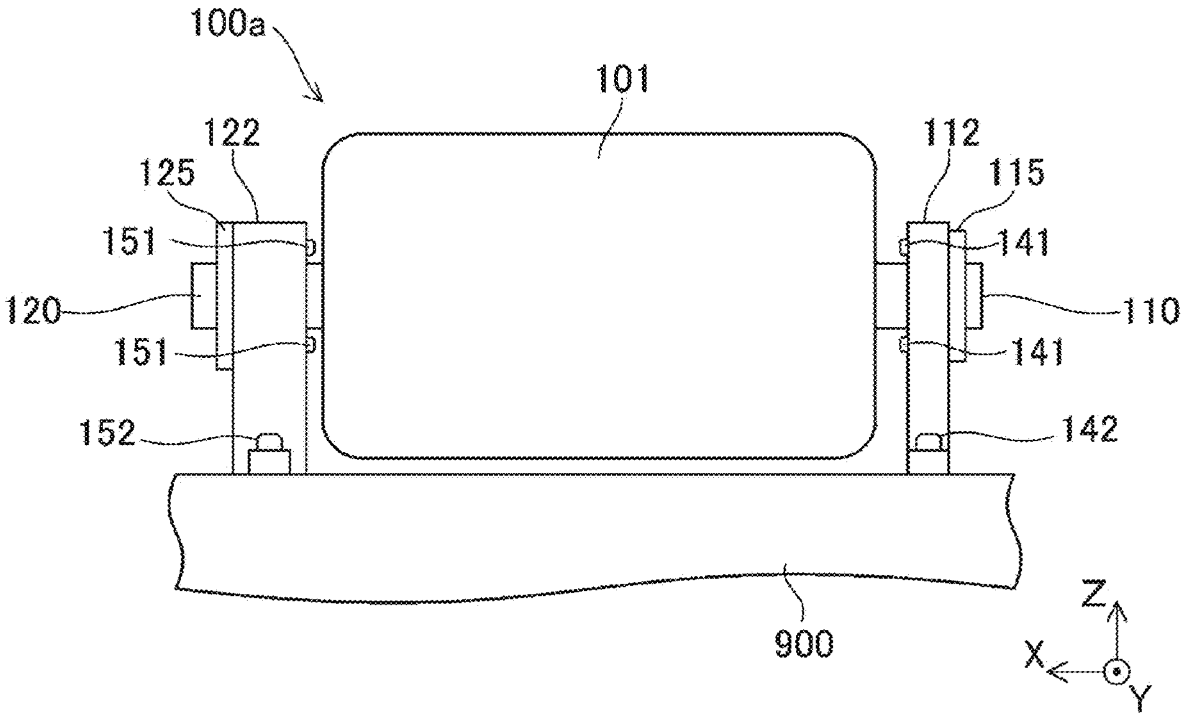
FIG. 5 is a side view of a gas tank 100*a* according to a modification.

FIG. 5 is a side view of a gas tank 100*a* according to a modification. In the gas tank 100*a*, the orientation of the plate bolts 141 differs from that of the gas tank 100 of the embodiment. In the gas tank 100*a*, the direction of the cover bolt 151 differs from that of the gas tank 100 of the embodiment.

In the gas tank 100*a*, the heads of the plate bolts 141 are located between the neck mount 112 and the tank body 101. Therefore, the gas tank 100*a* can effectively utilize the space outside the neck mount 112 (opposite the tank body 101).

In the gas tank 100*a*, the head of the cover bolt 151 is located between the neck block 122 and the tank body 101. Therefore, the gas tank 100*a* can effectively utilize the space outside the neck block 122 (opposite the tank body 101).

The points to be noted regarding the technique described in the embodiment will be described. The neck mount 112 is a component for fixing one end (first neck 110) of the tank body 101 to the device (fuel cell 900). The flange 112*b* of the neck mount 112 corresponds to a fixing portion for fixing the neck mount 112 to the device (fuel cell 900). The neck block 122 is a component for supporting the other end (the second neck 120) of the tank body 101 to the device (the fuel cell 900). The flange 122*b* of the neck block 122 corresponds to a fixing portion for fixing the neck block 122 to the device (fuel cell 900).

One of the first neck 110 and the second neck 120 also serves as a base, and includes a main stop valve therein. Both the first neck 110 and the second neck 120 may also serve as a base, and a main stop valve may be provided inside each base.

The slide collar 129 may be cut into two portions in a plane passing through the axis.

The gas tank disclosed in the present specification can also be applied to a device other than the fuel cell 900. The gas stored in the tank body 101 may be any gas.

Although specific examples of the disclosure have been described in detail above, the examples are merely examples and do not limit the scope of claims. The technique described in the claims includes various modifications and variations of the specific examples exemplified above. The technical elements described in the present specification or in the drawings exhibit technical usefulness alone or in various combinations, and are not limited to the combinations described in the claims at the time of filing the application. In addition, the technique exemplified in the present specification or drawings can achieve a plurality of purposes at the same time, and achieving one of the purposes itself has technical usefulness.

What is claimed is:

1. A gas tank comprising:
- a tank body;
- a first neck extending along an axis of the tank body from one end of the tank body and including an external thread on an outer periphery;
- a neck mount for fixing the tank body to an apparatus, the neck mount having a first internal thread hole engaged with the external thread;
- a mount plate having a second internal thread hole engaged with the external thread and facing the neck mount; and
- a plate bolt for pressing the mount plate against the neck mount parallel to the axis.

2. The gas tank according to claim 1, further comprising:
- a second neck provided at the other end of the tank body and extending along the axis;
- a neck block for supporting the tank body on the apparatus, the neck block having a recess and having, at a bottom of the recess, a hole through which the second neck passes;
- a slide collar fitted to an outer periphery of the second neck and disposed in the recess;
- a cover plate that covers the recess; and
- a cover bolt for fixing the cover plate to the neck block, the cover bolt being fastened to the neck block along the axis.

3. The gas tank according to claim 2, wherein the cover plate is bisected in a plane passing through the axis.

* * * * *